Patented May 5, 1942

2,281,924

UNITED STATES PATENT OFFICE 2,281,924

EXECUTING REACTIONS WITH THE AID OF FUGITIVE CATALYSTS

Martin de Simó, Piedmont, and Frank M. McMillan, Berkeley, Calif., assignors to Shell Development Company, San Francisco, Calif., a corporation of Delaware No Drawing. Application January 15, 1940, Serial No. 313,937

6 Claims. (Cl. 260—676)

The present invention relates to an improved method for the execution of reactions, particulary conversions of hydrocarbons, with the aid of catalysts containing anhydrous aluminum chloride.

An object of the invention is to provide an improved method for employing anhydrous aluminum chloride catalysts. A more particular object is to provide a substantially improved method for the execution of vapor phase hydrocarbon conversions, especially the isomerization of butane, with the aid of aluminum chloride.

The present invention, as above stated, relates in particular to a method for executing reactions with the aid of contact masses containing aluminum chloride. In continuous processes employing such catalysts, aluminum chloride tends to escape from the reaction zone with the reaction mixture due to an appreciable vapor pressure or a small solubility.

Anhydrous aluminum chloride, as is well known, is an excellent catalyst for a wide variety of reactions. It is a solid material having an appreciable vapor pressure (it sublimes at 183° C.) and a small but distinct solubility in most hydrocarbons. In view of its excellent catalytic properties, it is widely used for effecting hydrocarbon conversions. In the various hydrocarbon conversion processes, it is customary to suspend the aluminum chloride in a finely divided state in the reaction mixture. This method, when operating in the conventional batch-wise process, is quite satisfactory. In certain cases where the reaction temperature is quite low and the hydrocarbons employed are capable of holding only very small quantities of aluminum chloride in solution, this method is also suitable for continuous operation. In many cases, however, a continuous process has hitherto been impractical due to loss of the aluminum chloride from the reaction zone with the reaction products. This not only tends to quickly deplete the reaction zone of active catalyst and increases the consumption of catalysts, but, in many cases, causes complications in various other parts of the plant and in the recovery and working up of the products.

In certain processes, such in particular as the isomerization of butane, it has been proposed to support the aluminum chloride on an inert carrier material and to pass the gaseous reactants thereover. This method has the disadvantage of requiring the use of considerable pressure in order to minimize the loss of aluminum chloride from the reaction zone by volatilization. Even when pressures of about 10 atmospheres are employed at a temperature in the neighborhood of 100° C., substantial quantities of aluminum chloride are carried out of the reaction zone with the reaction products. In such cases the aluminum chloride tends to gradually deposit in various cooler sections of the plant and causes considerable annoyance and hazard by clogging up the pipes, etc.

According to the process of the present invention, the escape of aluminum chloride from the reaction zone into various parts of the plant with the reactants is substantially avoided by employing a suitable solid adsorptive material which is unsaturated with respect to the aluminum chloride. We have found that aluminum chloride is quite readily and more or less selectively adsorbed by a number of solid adsorptive materials, and that if such materials are employed in close association with the catalyst, the escape of aluminum chloride from the reaction zone may be materially reduced or practically avoided in a very simple and practical manner.

When employing anhydrous aluminum chloride supported on a suitable carrier such, for instance, as one of the natural-occurring minerals or clays, treated clays and clay-like materials, artificially prepared materials such as activated alumina, the permutites, active charcoal, chamotte and the like, a very suitable and efficient adsorption material which is preferably employed according to the invention is adsorptive alumina.

The absorptive material may be employed in either one of two ways. According to one specific embodiment of the invention, the solid adsorptive alumina which is unsaturated with respect to aluminum chloride, is mixed with the solid catalyst prior to charging to the reaction chamber. According to another specific embodiment of the invention, the solid adsorptive alumina and the catalysts are separately placed in the reactor in such a manner that the reactants pass first through a bed of catalyst and then through a bed of adsorptive alumina. This latter method is, in general, more advantageous since the adsorptive material may be easily replaced periodically without removing or replacing the catalyst. When treating hydrocarbon vapors with supported aluminum chloride catalysts, this method of operation affords several advantages which contribute considerably toward the economy and practicability of the process. Thus, for example a suitable carrier may be impregnated with aluminum chloride to substantial saturation and the resulting catalyst charged to the reactor. A layer of adsorptive material, for instance activated alumina, may then be placed in the reactor so that the reactants pass first through the catalyst and then through the activated alumina. During execution of the reaction, aluminum chloride is gradually vaporized from the catalyst and is carried with the reactants. When operating in this manner it is found that nearly all of the aluminum chloride is adsorbed by the layer of activated alumina. Thus, the reaction products leaving the reactor are substantially free of aluminum chloride and do not tend to deposit the aluminum chloride in the cooler portions of the pipes. After a period of operation, the adsorptive alumina becomes partially saturated with aluminum chloride and decreases in efficiency. At this point it is desirable to remove the partially saturated adsorbent and replace it with a portion of fresh material. The catalyst also slowly depreciates in activity. After a single run in which the amount of catalyst and adsorbent are known, the relative amounts of catalyst and adsorbent which, when changed to the reactor, will each operate efficiently for approximately the same length of time, may readily be determined. By employing this ratio of catalyst and adsorbent, which may be 5:1 for instance, it is not necessary to replace the adsorbent or the catalyst separately, but they may be both replaced at regular intervals at the same time with only one shut-down period.

When operating as above described, a further and important advantage is that very little aluminum chloride is wasted, since the adsorptive material collects nearly all of the aluminum chloride which is removed from the catalyst mass. The spent adsorptive material, even after it has been employed for some time and has adsorbed considerable (for example 10% by weight) aluminum chloride, it is found, does not possess any appreciable catalytic activity. The aluminum chloride obtained in the spent adsorbent is, however, not lost since by simply impregnating it further with aluminum chloride (for instance, according to one of the methods described in copending application, Serial No. 292,295 filed August 28, 1939), it becomes an excellent catalyst.

If it is not desired to impregnate the spent adsorptive alumina (i. e., partially saturated with aluminum chloride by use) to produce catalysts, this material may also be most advantageously employed in the fore section of the reactor (before the catalyst) to effect a pre-treatment of the reactants. Thus, in the treatment of hydrocarbon vapors with supported aluminum chloride catalysts, it is advantageous to place a small portion of activated alumina or a similar-acting material in the reactor just before the catalyst bed. This serves to remove small amounts of detrimental materials from the incoming feed and materially increase the efficiency and life of the catalyst. It is found, however, that the adsorbent alumina of the present invention, after it has been partially saturated with aluminum chloride by use, is an ideal material for this pre-treatment, and is much superior to the fresh activated alumina, for this purpose. The superiority of the spent alumina over fresh alumina appears to be due to several factors. In the first place, in all hydrocarbon reactions where aluminum chloride is employed as a catalyst, an appreciable amount of free hydrogen halide is required to act as a promoter. This hydrogen halide is usually mixed with the reactants (usually in amounts ranging from 1 to 25%) before entering the reactor. When this mixture of hydrocarbons and hydrogen halide is passed through a bed of an adsorbent, such as activated alumina, in the reactor before passing into contact with the catalyst, it is found that considerable quantities of hydrogen halide are removed. This causes a deficiency in the amount of hydrogen halide in the reactants and considerably impairs the efficiency of the process for several hours until the adsorptive material becomes saturated with hydrogen halide. Also, as the adsorption of hydrogen halide from the feed by fresh adsorbents generates considerable heat, it often causes the deposition of tars, etc. on the adsorbent. The adsorbent material of the present invention, after it has been partially saturated with aluminum chloride, is already saturated with respect to hydrogen halide and it therefore causes none of these complications. Furthermore, most adsorptive aluminas contain an appreciable amount of water. Under ordinary conditions they do not lose this water but, on the other hand, are capable of adsorbing considerable quantities of water from the surrounding atmosphere. Under the conditions of the process, however, where moderately elevated temperatures, for example 50–150° C., prevail and a moisture-free feed containing 1–25% hydrogen chloride is continuously being passed thereover, these fresh adsorbents give up considerable quantities of water (a large portion of it being replaced by hydrogen halide). This water which is released from the adsorptive alumina reduces the efficiency of process, especially at the beginning of the run. The adsorbent material of the present invention, after it has been spent by use, is incapable of losing further water under the reaction conditions, and is, therefore, much superior in this respect.

The following example illustrates an application of the invention and the advantageous results obtainable thereby.

*Example*

A supported aluminum chloride catalyst was prepared as follows: 6–8 mesh activated alumina was soaked in molten anhydrous aluminum chloride for two hours at a temperature of about 225° C. under pressure, and then drained for 15 minutes under the same conditions. The prepared catalyst contained 25.7% anhydrous aluminum chloride. 5.7 liters of this catalyst was charged to a suitable cylindrical reactor whereupon one liter of fresh activated alumina was placed on top. The reactor was then closed and heated to about 103–110° C., and maintained at this temperature while n-butane vapors containing 2.3 mol percent HCl were passed therethrough under about 12 atmospheres pressure at a rate of 1.32 kgs. per liter catalyst per hour. The product was found to be substantially free of aluminum chloride, even up to over 500 hours of continuous operation. At the end of the run it was found that substantially no aluminum chloride had been removed from the reactor, i. e., the loss in weight of the catalyst was almost exactly equal to the gain in weight of the absorptive alumina.

Besides the isomerization of normal butane as illustrated above, other processes involving the use of aluminum chloride catalysts in which the method of our invention is especially advantageous are: In the isomerization of n-pentane, for instance according to the process described in British Patent No. 498,463; in the isomerization of cycloparaffin hydrocarbons, such as the isomerization of methyl cyclopentane to cyclohexane; in the production of isobutane, for instance according to the processes described in copending application Serial No. 297,104 filed September 29, 1939, and U. S. Patent No. 2,172,146; in the polymerization of olefins, for instance according to the process described in U. S. Patent No. 1,923,583.

The present application is a continuation-in-part of our copending application Serial No. 292,295 filed August 28, 1939.

While we have described our invention in its preferred embodiments and have submitted an example illustrating the use of the same, we are aware that various modifications will be apparent to those skilled in the art. It is to be understood, therefore, that the details herein disclosed are not to be construed as limiting the invention and that no limitations other than those imposed by the scope of the claims are intended.

We claim as our invention:

1. In a process for isomerizing butane in the vapor phase with the aid of a supported aluminum chloride catalyst, the step of continuously passing vapors of normal butane in contact with the catalyst and immediately thereafter under substantially the same conditions with an adsorptive alumina, whereby aluminum chloride vapors are substantially adsorbed from the reaction mixture.

2. In a process for effecting reactions in the vapor phase with the aid of an anhydrous aluminum chloride catalyst, the step of continuously passing a reactant in contact with the catalyst and immediately thereafter under substantially the same conditions with an adsorptive alumina, whereby aluminum chloride vapors are substantially adsorbed from the reaction mixture.

3. In a process for effecting hydrocarbon conversions in the vapor phase with the aid of an anhydrous aluminum chloride catalyst, the step of continuously passing hydrocarbon vapors to be reacted in contact with the catalyst and immediately thereafter under substantially the same conditions with an adsorptive alumina, whereby aluminum chloride vapors are substantially adsorbed from the reaction mixture.

4. In a process for isomerizing butane in the vapor phase with the aid of a supported aluminum chloride catalyst, the step of continuously passing vapors of normal butane in contact with the catalyst and immediately thereafter under substantially the same conditions with an adsorptive alumina, whereby aluminum chloride vapors are substantially adsorbed from the reaction mixture, periodically replacing the adsorptive alumina with fresh adsorptive alumina, and employing the replaced adsorptive alumina to pretreat the butane vapors prior to contact with the catalyst.

5. In a process for effecting reactions in the vapor phase with the aid of an anhydrous aluminum chloride catalyst, the step of continuously passing a reactant in contact with the catalyst and immediately thereafter under substantially the same conditions with an adsorptive alumina, whereby aluminum chloride vapors are substantially adsorbed from the reaction mixture, periodically replacing the adsorptive alumina with fresh adsorptive alumina, and employing the replaced adsorptive alumina to pretreat the reactant vapors prior to contact with the catalyst.

6. In a process for effecting hydrocarbon conversions in the vapor phase with the aid of an anhydrous aluminum chloride catalyst, the step of continuously passing hydrocarbon vapors to be reacted in contact with the catalyst and immediately thereafter under substantially the same conditions with an adsorptive alumina, whereby aluminum chloride vapors are substantially adsorbed from the reaction mixture, periodically replacing the adsorptive alumina with fresh adsorptive alumina, and employing the replaced adsorptive alumina to pretreat the hydrocarbon vapors prior to contact with the catalyst.

MARTIN DE SIMÓ.
FRANK M. McMILLAN.